United States Patent

Clos et al.

[15] 3,701,307
[45] Oct. 31, 1972

[54] SHUTTER RELEASE MECHANISM IN PHOTOGRAPHIC CAMERAS

[72] Inventors: Karl Clos, Katzenfurt; Fritz Keiner, Ehringshausen, both of Germany

[73] Assignee: Ernst Leitz GmbH, Wetzlar, Germany

[22] Filed: Sept. 20, 1971

[21] Appl. No.: 181,758

[30] Foreign Application Priority Data

Sept. 30, 1970 Germany..........P 20 48 078.8

[52] U.S. Cl.....................................95/10 PO, 95/42
[51] Int. Cl..............................................G03b 19/12
[58] Field of Search...........................................95/42

[56] References Cited

UNITED STATES PATENTS 3,468,232  9/1969  Knapp............................95/42

FOREIGN PATENTS OR APPLICATIONS 1,445,351  5/1966  France.....................95/10 PO Primary Examiner—Samuel S. Matthews
Assistant Examiner—Michael D. Harris
Attorney—Krafft & Wells

[57] ABSTRACT

In a photographic camera including a light path barrier component in the space between the objective and the film, and further including a release rod for releasing the camera shutter, the release rod is arranged to render the barrier component movable out of the light path upon rod actuation. During the movement of the barrier component the latter reacts on the release rod and moves it further, thereby eventually releasing the camera shutter automatically and independently from the camera operator.

5 Claims, 4 Drawing Figures

KARL CLÖS
FRITZ KEINER
INVENTORS

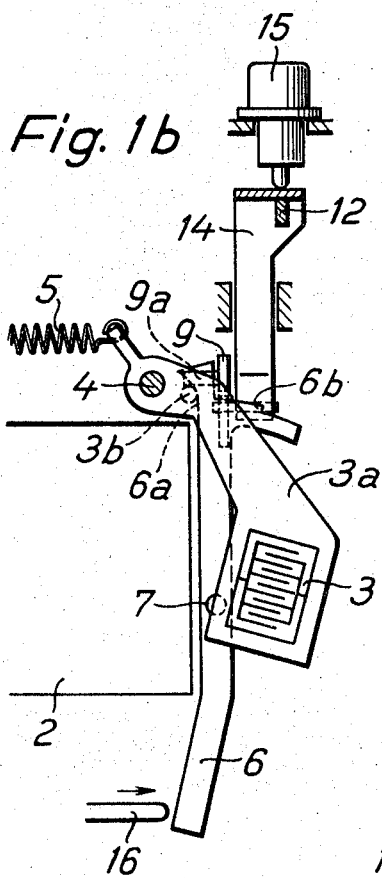
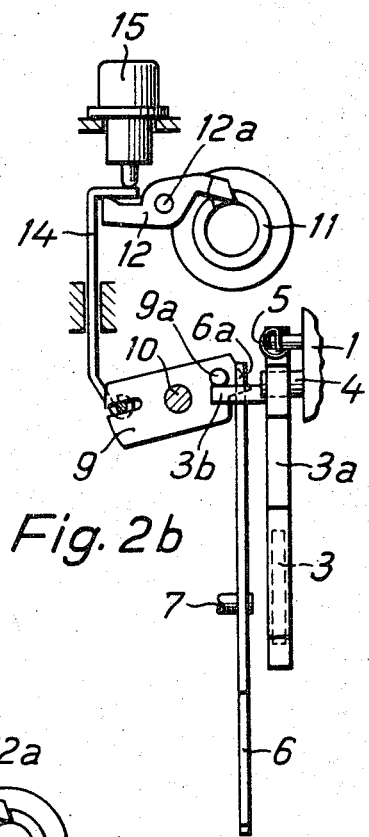
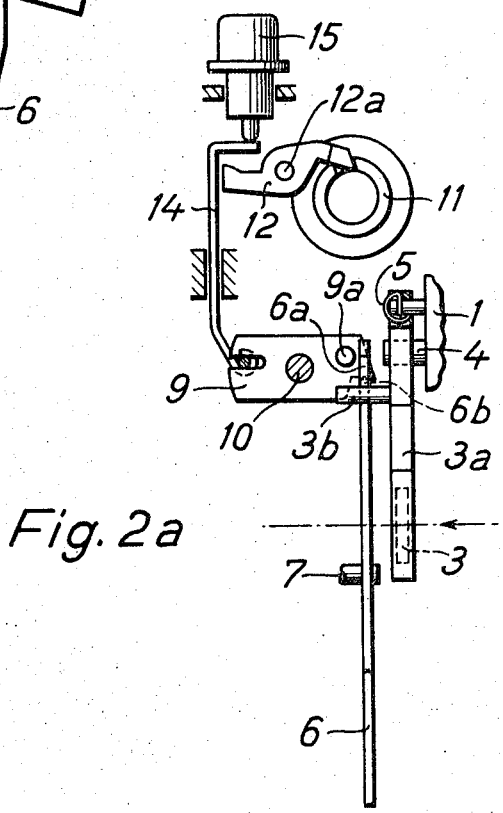

SHUTTER RELEASE MECHANISM IN PHOTOGRAPHIC CAMERAS

BACKGROUND OF THE INVENTION

The present invention relates to a shutter release mechanism for a camera.

In single lens mirror reflex cameras it is known to take steps to ensure that the shutter cannot be released until the reflex mirror deflecting the rays to the viewfinder has been completely removed from the optical path. In particular, the shutter release button may not actually release the shutter directly, but may release the mirror, which then swings and during the last part of its movement strikes a lever to cause operation of the shutter. The shutter release button together with the release rod is thus mechanically completely independent from the shutter mechanism proper.

It is the object of the present invention to provide another shutter release mechanism which is actuated in dependence on e.g., a reflex mirror or any other light path barrier component moving out of the light path.

SUMMARY OF THE INVENTION

This object is attained by providing a shutter release mechanism for a camera, comprising a release rod actuable to operate a shutter and connected to a light path barrier component, the arrangement being such that upon actuation of the release rod it moves to render the barrier component out of the light path by drive means, and that during further movement of the barrier component the latter reacts on the release rod to cause releasing of the shutter. According to the invention the mechanism may comprise a catch lever so connecting the release rod to the barrier component that upon actuation of the shutter release button the release rod pivots the catch lever in one direction out of a position in which the catch lever causes blocking of the barrier component against movement out of the light path, and that during further movement of the barrier component the latter pivots the catch lever further in said one direction.

The mechanism may comprise a shutter release lever which is entrained by the release rod during the further movement of the barrier component.

Suitably, the barrier component comprises a reflex mirror, and alternatively the barrier component comprises a photoresistor of a light intensity measurement device.

Through the arrangement of the components according to the invention the improvement may be achieved that a single release rod can now be used for operating the shutter and for operating the barrier component, so that in a general way a simplified construction of the release mechanism is achieved.

This type of shutter release is suitable for cameras in which the barrier component situated in the optical path of the taking lens is the reflex mirror of a single-lens mirror reflex camera, but it may also be the photoresistor of an exposure measuring device which is mounted retractably on a carrier arm and held in the optical path of the taking lens of a camera with through-the-lens exposure measurement.

BRIEF DESCRIPTION OF THE DRAWINGS

The invention will be more readily comprehended from the following description of a photographic camera with through the lens exposure measurement and with a retractable photoresistor in the light path when taken in conjunction with the appending drawings, wherein:

FIG. 1b shows a part of the embodiment of FIG. 1a in which the release mechanism is in the released condition;

FIG. 2a is a diagrammatic front elevation view of the release mechanism in the cocked condition; and FIG. 2b is a side elevation view of the release mechanism shown in FIG. 2a, in the released condition.

DESCRIPTION OF THE PREFERRED EMBODIMENT

Figure 1A:
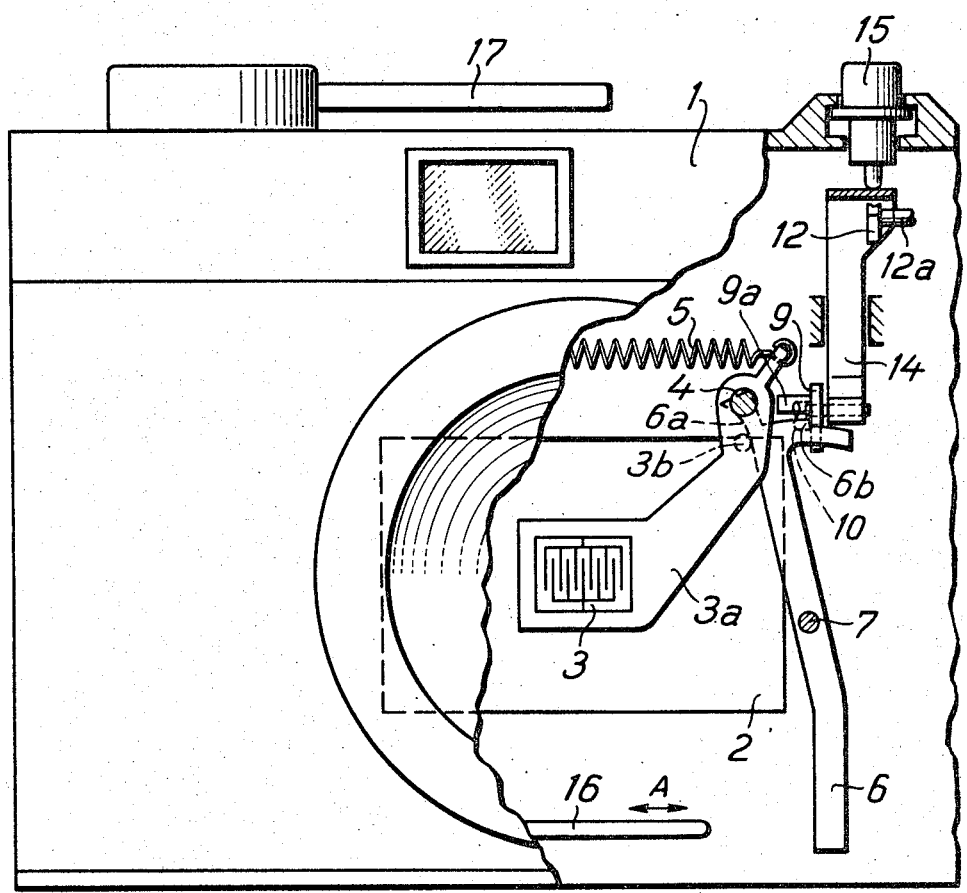
FIG. 1a is a diagrammatic front elevation view of the camera with a photoresistor in the swung-in position and with the shutter release mechanism in the cocked condition.

In FIG. 1, 1 designates the casing of a camera in which a photoresistor 3 has been swung into the optical path of the lens in front of a camera aperture 2. The photoresistor 3 is held by a carrier arm 3a which is swivellable about a pin 4 and which is acted on by a tension spring 5 which urges it to turn in the counter-clockwise direction out of the optical path.

The carrier arm is prevented from turning out of the optical path by a locking lever 6, which is rockable about a pin 7 and which at its end nearer the photoresistor is formed into a curve 6a. A pin 3b fastened on the carrier arm 3a lies against this curve, and the locking lever 6 is in turn prevented from rocking by a catch lever 9, one end of which engages behind a projection 6b on the locking lever 6. The catch lever 9 is in the form of a two-armed lever (FIG. 2a) and is rockable about a pin 10.

The shutter of the camera is a roller-blind shutter moving from top to bottom, only the spindle 11 of the first shutter blind being shown in FIGS. 2a and 2b.

In FIGS. 1a and 1b the shutter elements (blinds and rollers) lie in front of the upper parts of the carrier arm and locking lever, and if shown, would have masked these elements.

As may be seen more particularly from FIGS. 2a and 2b, the spindle 11 is prevented from operating by means of a lever 12. This is likewise a two-armed lever which is rockable about a pin 12a and the front end of which engages in a slot in the spindle 11.

The catch lever 9 and the lever 12 are operatively connected together by means of a release rod 14. The latter is articulated at its bottom end to the catch lever 9, while its upper end is bent over and this bent-over end is situated above the free end of the lever 12.

The release rod 14 is acted on by a release button 15, which is accessible outside the camera to a user.

FIGS. 1a and 2a show in front and side views the components in the cocked position. The catch lever 9 holds the locking lever 6, and consequently the carrier arm 3a, in their swung-in position. Similarly the lever 12 prevents the spindle 11 of the first shutter blind from operating. In this phase of operation the bent-over end of the release rod 14 is situated opposite, but at a distance from the free end of the lever 12. This distance may conveniently amount to 1.2 mm.

On the other hand, FIGS. 1b and 2b show the shutter release mechanism after the photoresistor has been swung out of the optical path and immediately before release of the spindle 11. It may be seen particularly from FIG. 2b that the release button 15 has been pressed down. The catch lever 9 has thus been turned in the counterclockwise direction, thereby freeing the projection 6b of the locking lever 6. Under the tension of the spring 5 the carrier arm 3a has thus likewise been able to turn in the counterclockwise direction, and by means of the pin 3b to press the locking lever 6 in the clockwise direction (FIG. 1a, 1b)

At the end of its movement the carrier arm 3a presses by means of its pin 3b against a pin 9a which is fastened on the front end of the catch lever 9. In FIG. 2a the pin 3b is approaching the pin 9a from below. The moment of impact is illustrated in FIG. 2b. As is likewise shown in FIG. 2b in this position the release rod 14 lies with its bent-over end directly above the free end of the lever 12, and it is therefore easily understandable that the action of the pin 3b on the pin 9a leads to further rotation of the catch lever 9 in the counterclockwise direction, while at the same time the release rod 14 is pulled down. This second downward movement of the release rod likewise conveniently amounts to 1.2 mm, and in this way the bent-over end of the release rod 14 now also turns the lever 12 in the counterclockwise direction, whereby the spindle 11 and the first shutter blind are freed for operation.

The entire mechanism is thus released in two stages, but by means of the same release rod 14. The pressure on the release button 15 moves the rod 14 downwards and effects the outward rocking of the photoresistor, the carrier of which reacts on the release rod 14 and causes the latter to move further downwards, thereby finally releasing the shutter.

During winding-on of the film, which is accompanied by the recocking of the shutter, the photoresistor is again swung into the optical path. This is effected with the aid of an element 16 which on the operation of a film transport and shutter clocking lever 17 is moved to-and-fro once in the direction of the double arrow A (FIG. 1a) by means of an eccentric (not shown). The element 16 acts on the locking lever 6 and rocks the latter in the counterclockwise direction until the catch lever 9 once again drops behind the projection 6b. By means of its curved portion, the locking lever 6 thus presses the carrier arm 3a back by means of pin 3b, so that the photoresistor is once again situated in the optical path of the lens.

What is claimed is:

1. A shutter release mechanism in photographic cameras having a light path barrier component in the space between the objective and the film and further including a release rod for releasing the camera shutter, the mechanism comprising;
    a. a realease rod actuable to operate the shutter and connected to the light path barrier component,
    b. drive means for restricting motion of said light path barrier component and for moving the light path barrier component out of the light path upon actuation of the release rod, said drive means being constructed and arranged such that upon actuation of the release rod the latter initially moves to cause said drive means to release said barrier component for an initial movement out of the light path, and that during further movement of the barrier component the latter reacts on the drive means to impart further motion to said release rod to cause releasing of the shutter.

2. A mechanism as claimed in claim 1, comprising a catch lever so connecting the release rod to the barrier component that upon actuation of the shutter release rod the latter pivots the catch lever in one direction out of a position in which the catch lever causes blocking of the barrier component against movement out of the light path, and that during the further movement of the barrier component the latter pivots the catch lever further in said one direction.

3. A mechanism as claimed in claim 2, comprising a shutter release lever which is entrained by the release rod during the further movement of the barrier component.

4. A mechanism as claimed in claim 1, wherein the barrier component comprises a reflex mirror.

5. A mechanism as claimed in claim 1, wherein the barrier component comprises a photoresistor of a light intensity measurement device.

* * * * *